US005175417A

United States Patent [19]

Fujishima et al.

[11] Patent Number: 5,175,417

[45] Date of Patent: Dec. 29, 1992

[54] WINDOW INFORMATION APPARATUS

[75] Inventors: Takahisa Fujishima, Kawasaki; Hideo Tsuboi, Sagamihara, both of Japan

[73] Assignee: Fujitsu Limited, Kawasaki, Japan

[21] Appl. No.: 609,694

[22] Filed: Nov. 6, 1990

[30] Foreign Application Priority Data

Nov. 6, 1989 [JP] Japan ..................... 1-288123
May 18, 1990 [JP] Japan ..................... 2-128803

[51] Int. Cl.[5] ..................... G06K 5/00

[52] U.S. Cl. ..................... 235/380; 235/379; 902/22; 364/550

[58] Field of Search ..................... 235/379, 380; 902/22; 364/405, 408, 436, 550

[56] References Cited

U.S. PATENT DOCUMENTS

Re. 30,773 10/1981 Glaser et al. .
4,398,257 8/1983 Pacanini et al. ..................... 364/550
4,670,844 6/1987 Lach et al. ..................... 364/436
4,683,536 6/1987 Yamamoto ..................... 902/22
4,722,054 1/1988 Yorozu et al. ..................... 902/22
4,935,608 6/1990 Tanaka ..................... 902/22

FOREIGN PATENT DOCUMENTS 284764 10/1988 European Pat. Off. .
244212 5/1984 Fed. Rep. of Germany .
432935 3/1986 Fed. Rep. of Germany .
58-1258760 9/1983 Japan .
WO8202972 2/1982 World Int. Prop. O. .
WO300399 3/1983 World Int. Prop. O. .

OTHER PUBLICATIONS

Patent Abstracts of Japan, vol. 7, No. 282 (p. 243) (1427), Sep. 21, 1983 for JP-A-58158760.

*Primary Examiner*—Harold Pitts
*Attorney, Agent, or Firm*—Staas & Halsey

[57] ABSTRACT

When a reception request is made by a customer, a window information apparatus retrieves information corresponding to the reception request from a window storage unit which stores information on businesses and transactions conducted at windows and informs the customer of a suitable window for the reception request. Also, the window information apparatus assigns a receipt number to a reception request from a reception input device and calculates the expected waiting time at a window corresponding to the reception request. The expected waiting time at the window is updated in response to a termination of processing at the window terminal. The updated expected waiting time is output in response to an inquiry of the customer.

12 Claims, 10 Drawing Sheets

WINDOW INFORMATION APPARATUS

BACKGROUND OF THE INVENTION

The present invention relates to an apparatus for informing a visitor to a bank, a hospital or the like of the window at which his desired business or service is conducted, and of the probable waiting time at that window or the like.

DESCRIPTION OF THE RELATED ART

Places such as banks and hospitals conduct many kinds of transactions or customer services, and have different windows for conducting different kinds of transactions. Each window has an information plate to indicate the type of transaction it conducts.

However, information indicated on these information plates is very brief. For example, in banks, only such information as "money transfer (to another bank account), payment" is indicated. Therefore, a case may arise in which a customer lines up at a window which he thinks is the correct one for the transaction he wants to conduct, but when his turn comes, he finds that he is at the wrong window. He is then required to wait in line at another window. Thus, a problem arises in providing a good service to customers.

Alternatively, a window may be equipped with a ticket dispenser which issues numbered tickets to customers and transactions are conducted in the order of the numbers on the tickets, thereby relieving congestion at the window.

FIG. 1 illustrates a configuration of a conventional window reception system in a financial institution such as a bank.

In the figure, each bank window terminal 1 is operated at a window by a teller who conducts transactions such as deposits, withdrawals, money transfers, receipt and payment of money by check, etc. These transactions are controlled by a controller 2 connected to a host computer.

Each window is also equipped with an off-line ticket dispenser 3, which issues a numbered ticket to a customer who wants to conduct a transaction at the window. When one transaction is terminated at the window, the teller calls the next customer by number. In this way, transactions are conducted in numerical order.

With the window reception processing system described above, a customer can learn how many customers there are before him on the basis of the number that the teller calls and his ticket number, but he cannot learn his waiting time until his turn comes.

SUMMARY OF THE INVENTION

It is an object of the present invention to provide a window information apparatus which can fully inform customers of the kinds of transactions conducted at each window.

It is another object of the present invention to provide a window information apparatus which lets customers know their expected waiting times.

According to a feature of the invention, the input means is a means for inputting a customer's request to conduct a kind of business or transaction. The window information storage means stores information on transactions conducted at each window. The retrieval means retrieves from the window information storage means the window corresponding to the customer's inputted request, and information on this window. The output means outputs this information on the retrieved window.

In the above configuration, a customer inputs his desired transaction through the input means. The window for the transaction is retrieved from the window information storage means and the information on the retrieved window is output from the output means. It thus becomes possible to inform the customer of the window at which his desired transaction is conducted.

Another feature of the invention includes informing means for informing the window retrieved by the retrieval means of the presence of a customer's reception request. The window can thereby learn the presence of the customer's service request.

According to a further feature of the invention, when a reception request is made by a customer, the output means outputs information on the appropriate window and also outputs the number of persons waiting at that window. The customer can thereby learn the window at which his business is conducted and the number of persons waiting at that window.

According to a feature of the invention, when a service request is made by a customer, the output means outputs information on the retrieved window and also outputs the expected waiting time calculated by the waiting time calculating means. The customer can thereby determine the window at which his desired transaction is conducted and his expected waiting time at that window.

According to a still further aspect of the invention, the input means has an input unit for inputting a service request from a customer and an output unit for outputting a reception output.

A controller is connected to a window terminal at a window and to the input means and assigns a number to a service request from the reception input device, calculates the expected waiting time at the window corresponding to the service request and stores it in a reception registration file. It then outputs the receipt number and the expected waiting time to the input means. Moreover, the controller updates the expected waiting time in the reception registration file in response to termination of a transaction at the window and outputs the expected waiting time stored in the reception registration file in response to an inquiry about the expected waiting time from the input means.

According to another aspect of the invention, when a service request is made by a customer, a number is assigned to it and the expected waiting time at the window is calculated from the number of persons waiting at the window. The expected waiting time is updated each time a transaction is terminated at the window and the updated waiting time is output in response to an inquiry about the waiting time from the input means. Therefore, the customer can determine his expected waiting time at any time.

BRIEF DESCRIPTION OF THE DRAWINGS

FIG. 1 illustrates an example of a display.

DESCRIPTION OF THE PREFERRED EMBODIMENTS

Figure 1:
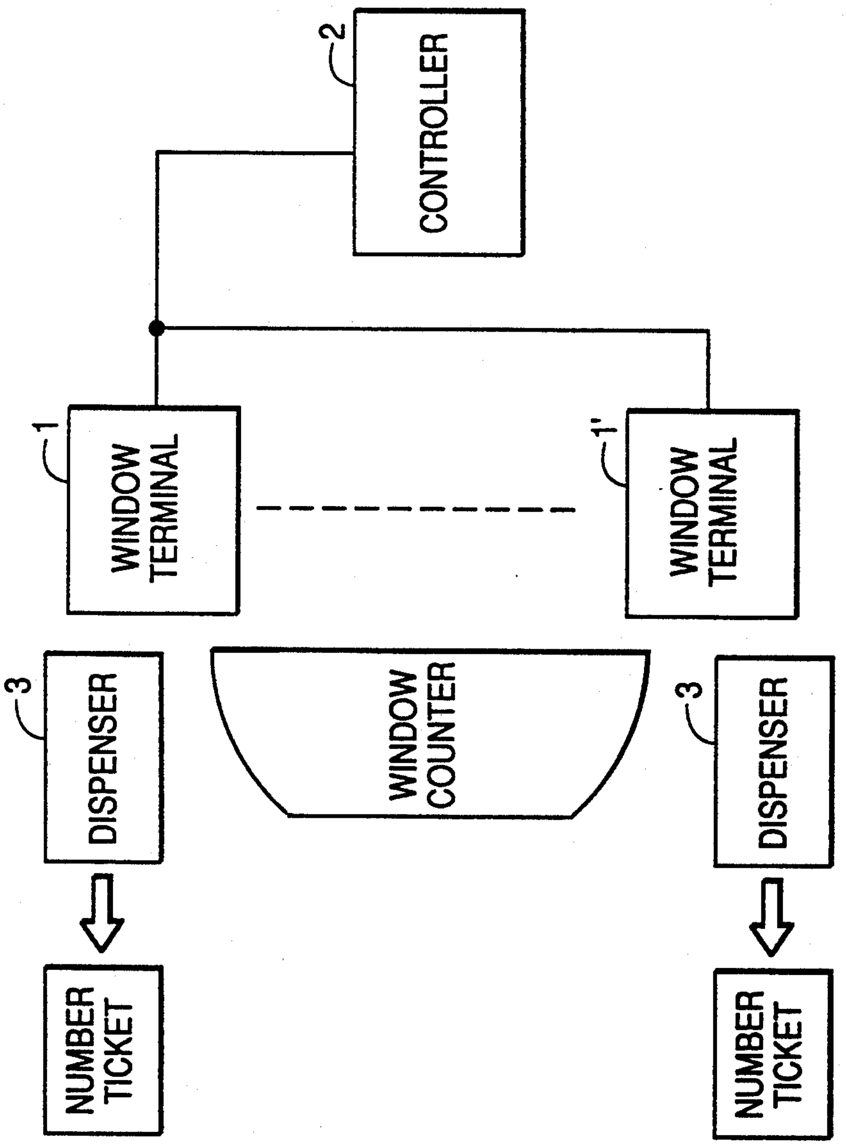
FIG. 1 illustrates the configuration of a conventional window information system.
Figure 2:
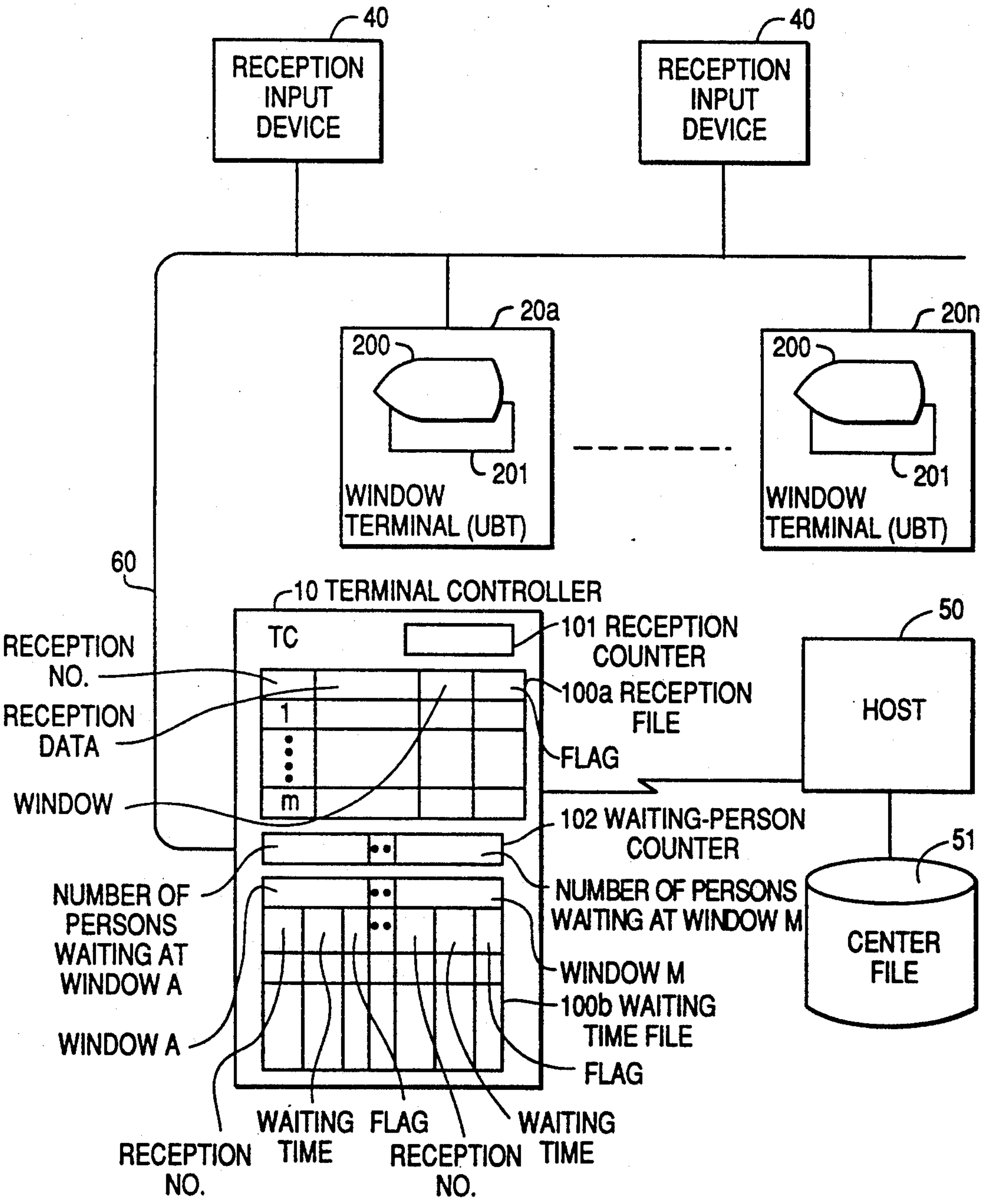
FIG. 2 illustrates the configuration of the first embodiment of the present invention.

Referring now to FIG. 2, which illustrates a bank window system according to the first embodiment of the present invention, a terminal controller (hereinafter referred to as TC) 10 is equipped with a reception counter 101 for providing service request numbers and a queuing counter 102 for counting the number of persons waiting at each of the windows A through M. The TC 10 contains a reception file 100*a* into which receipt data corresponding to receipt numbers, reception windows and unprocessed flags are entered and a waiting-time file 100*b* in which service request numbers classified by windows, expected waiting times and unprocessed flags are stored.

To the TC 10 are connected reception input devices 40 into which reception requests are entered by customers, and window terminals 20*a* to 20*n* placed at respective windows by a line 60. The TC 10 is also connected to the host computer 50, which contains a center file 51 for storing data on customers and the like.

Each of the window terminals (hereinafter referred to as UBTs) 20*a* to 20*n* comprises a display 200 and a keyboard 201, and conducts transactions such as deposits, withdrawals, transfers, etc.

Figure 3A:
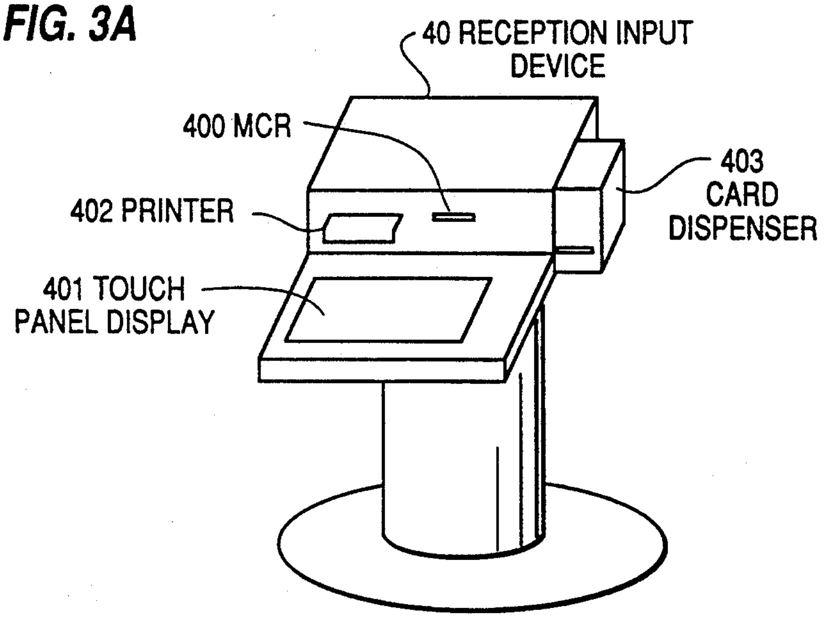
FIG. 3A illustrates the configuration of the reception input device.
Figure 3B:
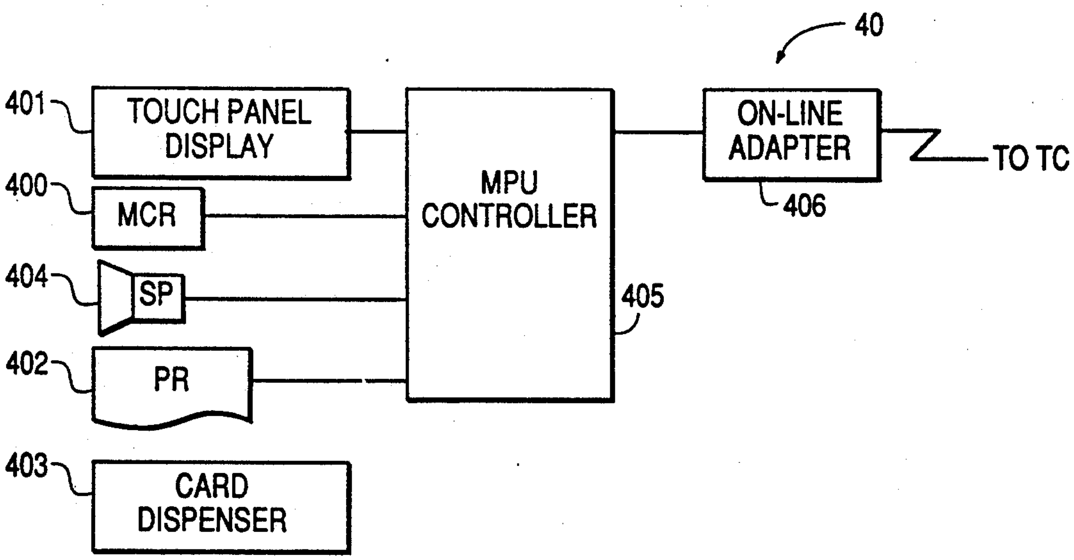
FIG. 3B illustrates the external appearance of the reception input device.

FIGS. 3A and 3B illustrate the reception input device. FIG. 3A illustrates its external appearance and FIG. 3B is a block diagram showing its operation.

The reception input device 40 is equipped with a magnetic card reader (MCR) 400 for reading customers' bank cash cards, personal reception cards and visitor cards (to be described later); a touch panel display 401 provided with an input touch panel on a display for displaying input and output items; a printer 402 for printing receipt slips on which receipt numbers, reception windows and waiting times are printed; a card dispenser 403 for issuing visitor cards; a loudspeaker 404 for voice guidance for operations; a controller 405 for controlling the touch panel display 401, the MCR 400, the loudspeaker 404 and the printer 402; and an on-line adapter 406 for connection to the TC 10.

In this embodiment, customers who have cash cards or personal reception cards issued by the bank can inquire reception inputs and waiting times by having their cards read by the MCR 400. Customers who do not have such cards can utilize visitor cards issued by the card dispenser 403.

To this end, visitor cards having magnetic stripes on which a sequence of numbers and a visitor card flag are recorded, are set in the card dispenser 403 so that visitors may take out a visitor card manually. When the cards are placed in the card dispenser, the last receipt number is entered into the TC 10 so that the end of the supply of cards is detected when the last card is read by the TC 10. Thus, the teller is informed of the end of the card supply through the window terminal 20. The visitor card can also be read by the MCR 400 to inquire about the reception input and waiting time.

At first, the expected waiting times at respective windows (deposit/withdrawal, transfer, draft, check, notification, etc.) are displayed on the touch panel display 401. After a card is inserted into the MCR 400, ten keys for inputting an identification (code) number and a menu of businesses are displayed. A desired business can be selected from the menu through the touch panel. After reception, a receipt number, the reception window and the expected waiting time are displayed. When an inquiry is made about the waiting time, the expected waiting time is displayed.

Figure 4:
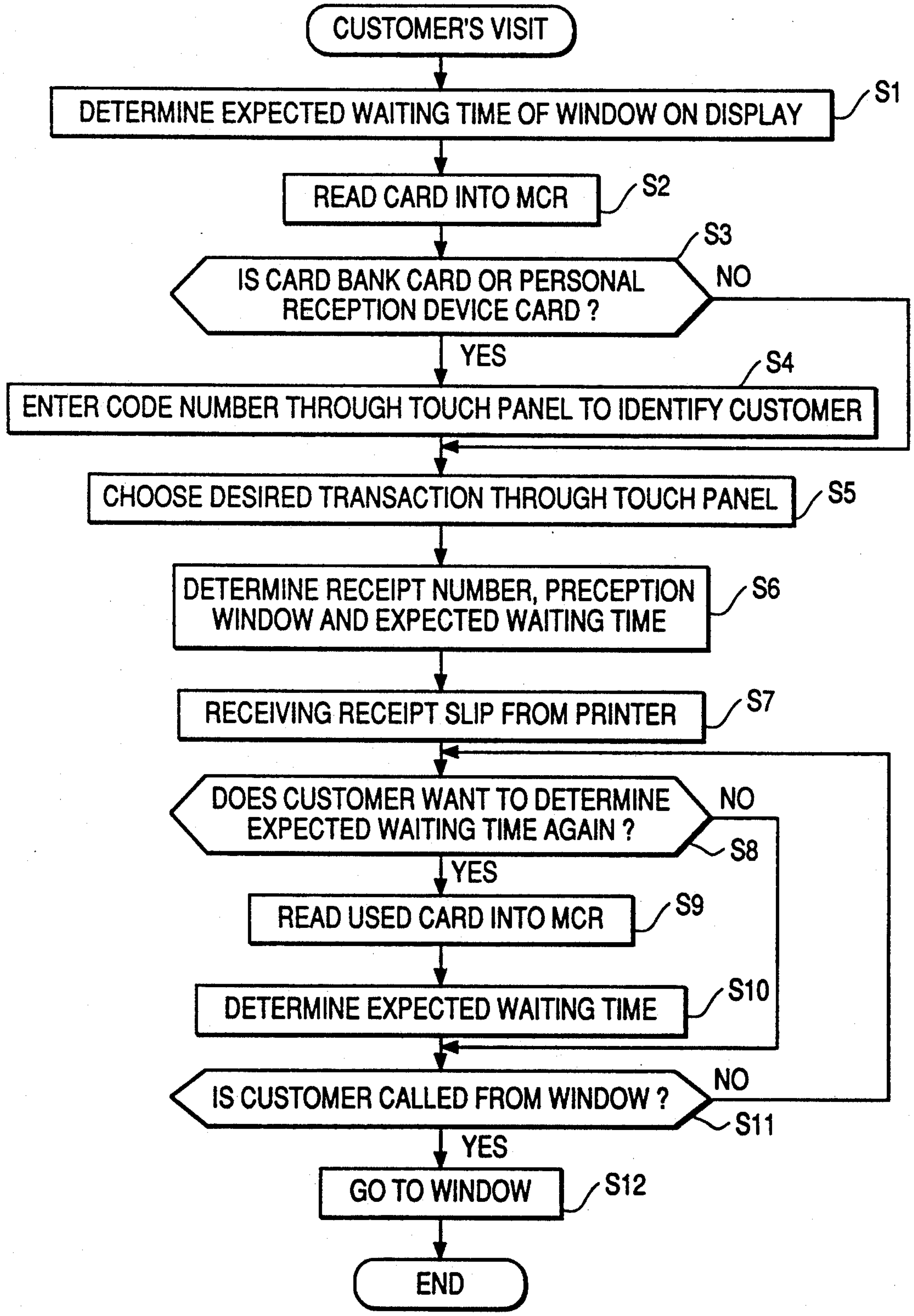
FIG. 4 is a flowchart of the customer reception procedure.

Next, the service request procedure for a customer in the present window information apparatus will be described with reference to FIG. 4.

After entering the bank, a customer goes to the input means 40 to determine the states of congestion at the windows from the expected waiting times shown on the windows displayed on the touch panel display 401 (step S1). He can thereby decide whether he wants to make a service request or come back later.

To make a service request, a customer with a cash (bank) card or a personal reception machine card has it read by the MCR 400. If he has no such a card, he takes a visitor card from the card dispenser 403 and has it read by the MCR (S2). Then, in the service request device 40, a decision is made as to whether the card read by the MCR is a cash card or a personal reception machine card (S3).

Cash cards and personal reception machine cards contain individual identification data such as an account number. Thus, when these cards are used, the customer can be identified through collation of his code number. For this reason, ten keys are displayed on the touch panel display 401 to enter the code number for identification (S4).

Next, the menu for transactions such as deposits/-withdrawals, transfers, etc. is displayed on the touch panel display 401. The customer selects his desired transaction from the menu through the touch panel (S5).

Next, the service request number, the appropriate window and the expected waiting time are displayed on the touch panel display 401 and the customer confirms them (S6). A receipt slip on which the display contents are printed is issued to the customer (S7) by the printer 402.

Subsequently, when wanting to reconfirm the expected waiting time (S8, YES), the customer has the card read into the MCR 400 of the reception input device 40. The updated expected waiting time is then displayed on the touch panel display 401 (S10). When the teller calls the customer by name or receipt number, the customer goes to the window to request the required transaction (S12).

In this manner, the service request process is initiated by the customer and the waiting time is displayed.

Next, the processing of each unit will be described.

Figure 5:
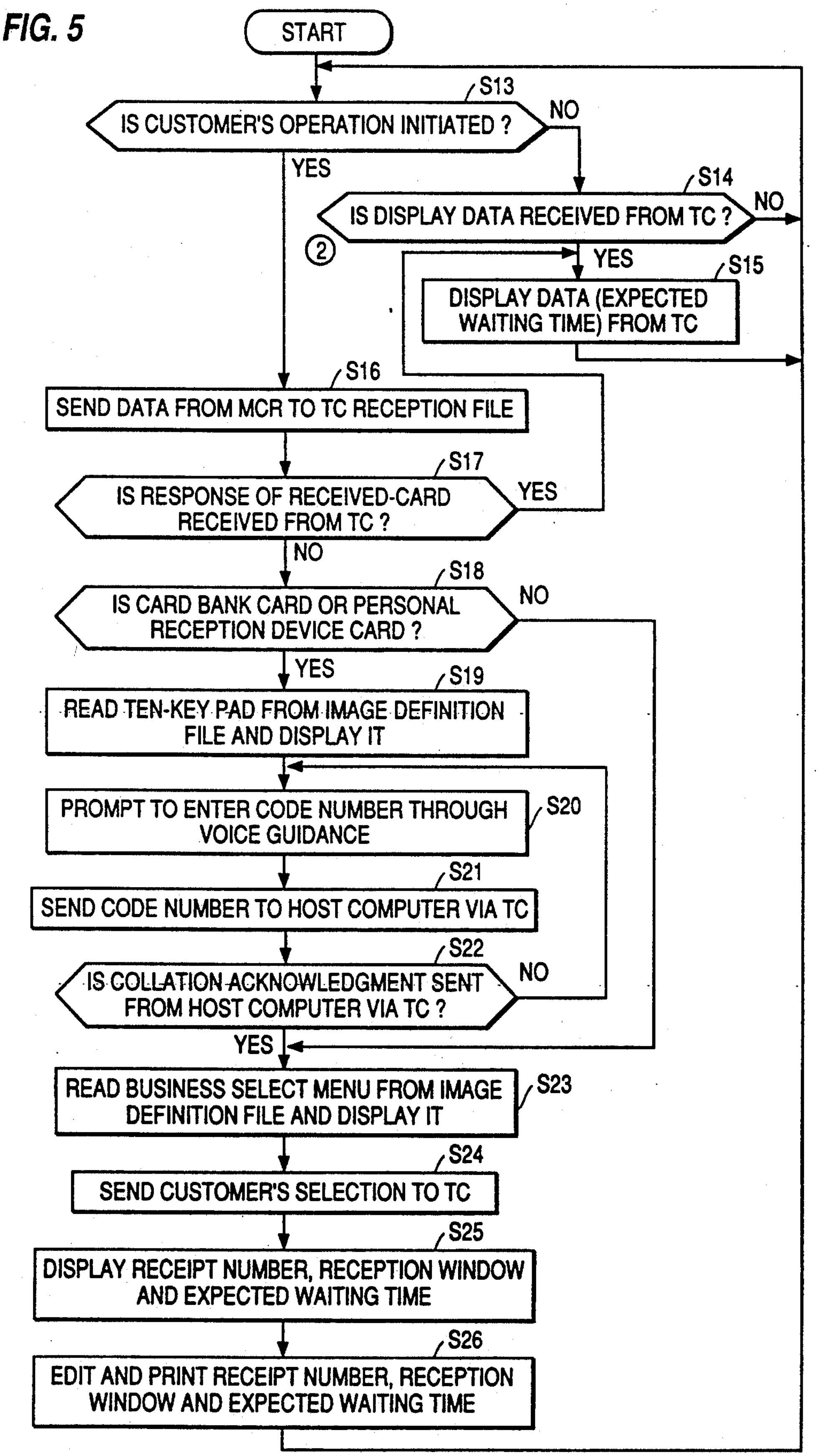
FIG. 5 is a flowchart of the process conducted by the input means, FIG. 6. is a flowchart of the service request processing in the terminal controller (TC) of FIG. 2.

FIG. 5 is a flowchart of the procedure of the reception input device 40.

The controller (hereinafter referred to as the MPU) 405 examines the card detecting information from the MCR 400 to determine whether or not an operation has been initiated by a customer (S13 in FIG. 5). If it has not, the MPU 405 checks whether or not display data has been received from the TC 10 (S14). If it has not, the process returns to step S13.

If it has, the MPU 405 displays it (expected waiting time) on the TC 10 on the touch panel display 401 (S15) and returns to step S13.

On determination of an initiation of a customer's operation (YES in step S13), the MPU 405 sends card data from the MCR 400 to the TC 10 via the on-line adapter 406 (S16). The TC 10 thereby performs card data processing (to be described later) and returns a fresh reception response (representing that a customer's card is newly received) or a finished reception response (representing that the customer's card has already been received) and the waiting time to the MCR. The MPU 405 examines whether or not the response from the TC 10 represents that the card has already been received (S17).

If the response from the TC is the finishedreception response, the waiting time which has been received as display data is displayed on the display 401 in step S15 and then the process returns to step S13.

For the fresh reception response, on the other hand, the MPU 405 performs the following steps.

First, in step S18, a determination is made based on card data as to whether the card is a bank card or a personal reception machine card. Visitor cards have a visitor card flag. Thus, cards other than visitor cards may be regarded as bank cards or personal reception machine cards. With a visitor card, collation of a code number is impossible. Thus, the process proceeds to step S23.

In the case of a bank card or a personal reception machine card, the MPU 405 reads a ten-key pad from its screen definition table for display on the touch panel display 401 (S19).

Next, the MPU 405 prompts the customer to enter his or her code number by voice guidance through the loudspeaker 404 (S20). Upon entry of the code number, the MPU 405 sends it to the TC 10 via the on-line adapter 406 (S21).

The TC 10 sends the card data and the code number to the host computer 50 in steps S32 through S34 to be described later in FIG. 6, and the host computer 50 collates the code number and returns the result of the collation to the TC 10.

The MPU 405 examines whether or not information about the confirmation of the code number has been sent from the TC 10 (S22). If not, it is considered that the code number could not be confirmed, the process returns to step S21.

On receiving confirmation of the code number from the TC 10, the MPU 405 reads a business selection menu and displays it on the touch panel display 401 (S23). The customer selects a desired transaction (deposit, withdrawal, etc.) from the menu through the touch panel and the MPU 405 sends the selection to the TC 10 (S24).

In step S25, the MPU 405 displays on the touch panel display 401 the receipt number, the reception window corresponding to the selected business and the waiting time at the window. These facts are sent from the TC 10 in steps S35 and S36 of FIG. 6, as described later.

The MPU 405 edits the receipt number, the reception window and the expected waiting time in a predetermined print format for application to the printer 402. The printer prints and issues a receipt slip (S26) and the process then returns to step S13.

In this manner, the expected waiting times at respective windows are displayed before reception, the customer's waiting time for a desired business is displayed at the time of reception, and the updated expected waiting time is displayed any time after reception. The reception window for a desired business is also displayed and a reception slip is issued for confirmation.

Figure 6:
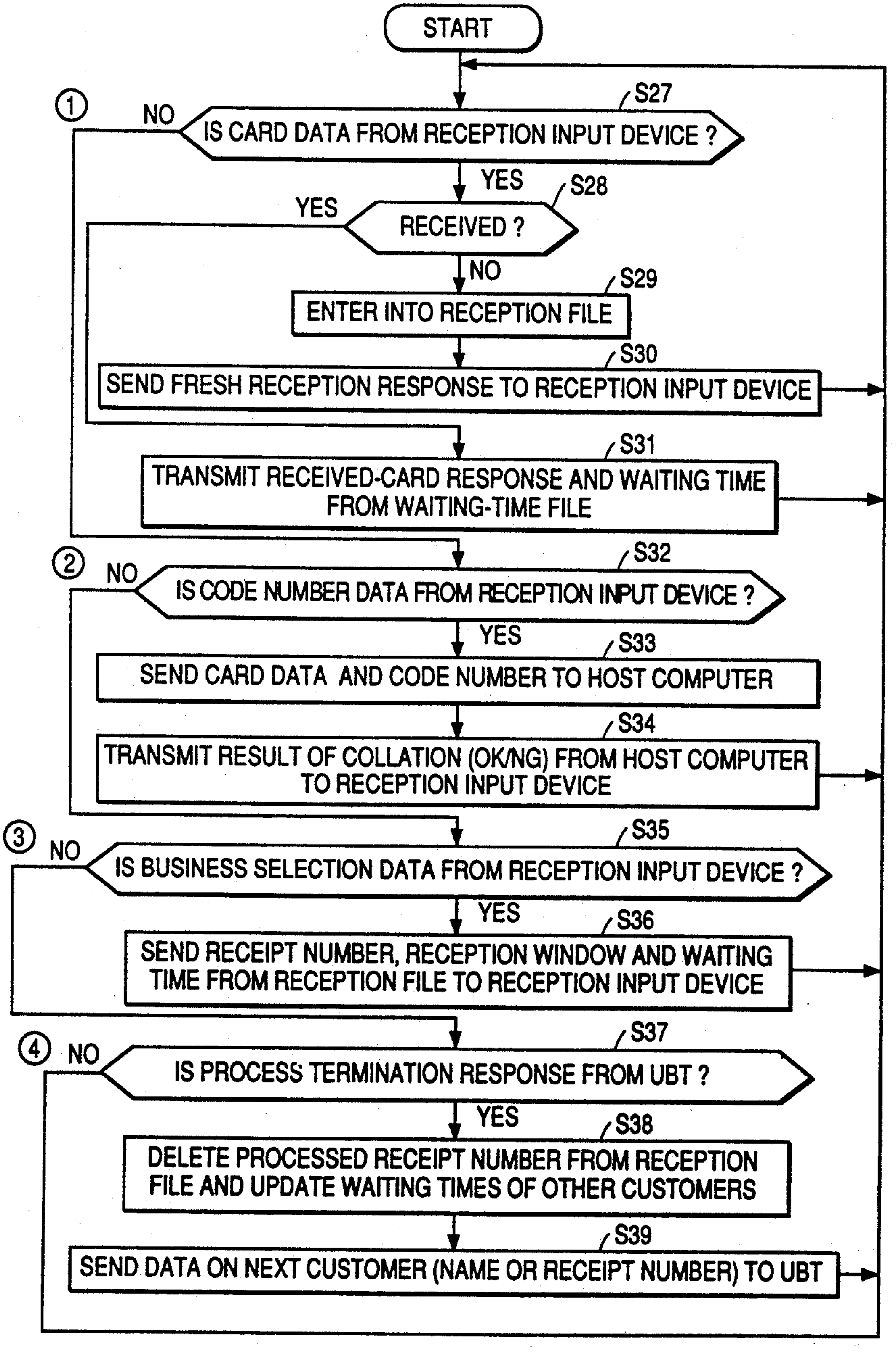

FIG. 6 is a flowchart of the reception procedure of the TC 10.

The TC 10 examines whether or not a message from the line 60 is card data from the reception input device 40 (S27). If it is, the TC 10 refers to the filed reception data of the reception file 100*a* in which the unprocessed flag is set to determine whether or not the card data has already been received (S28). If it has not, the TC receives a receipt number from the reception counter 101, stores the receipt number and card data (reception data) in the reception file 100*a* (S29), sets the unprocessed flag to "1" (unprocessed), advances the reception counter 101 and sends a fresh reception response to the reception input device 40 (S30).

Conversely, if the reception has been finished, the TC fetches the receipt number and reception window for the card data from the reception file 100*a* and the waiting time at the reception window for the receipt number from the waiting time file 100*b* and sends them to the reception input device 40 together with a reception finished response (S31).

If the message is not card data, the TC 10 examines whether or not the message is code-number data from the reception input device (S32). If it is, the TC sends the card data and code number from the reception file 100*a* to the host computer 50 (S33).

Figure 8:
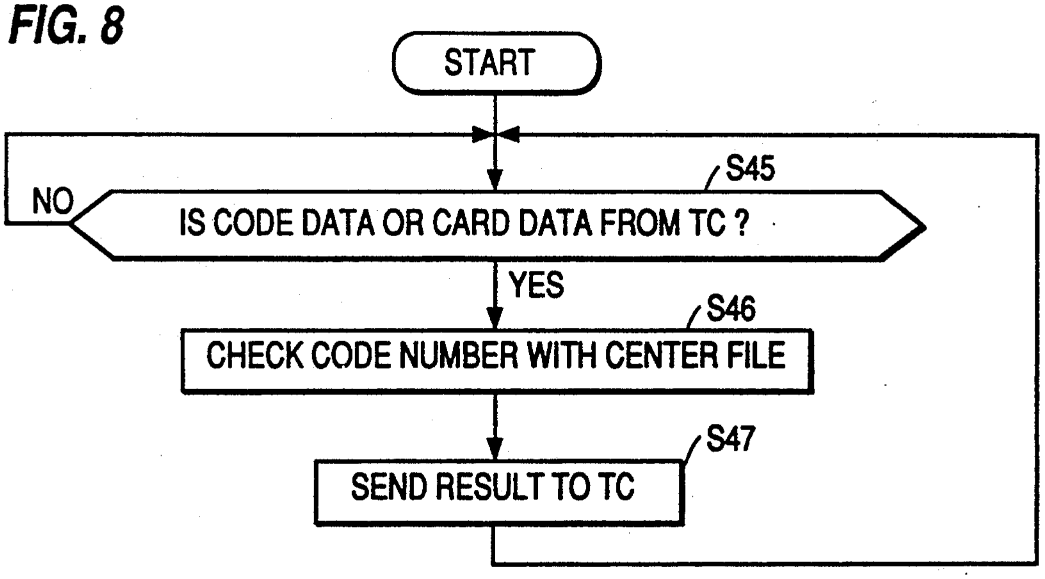
FIG. 8 is a flowchart of the operation of the host computer of FIG. 2.

As described in conjunction with FIG. 8, the host computer 50 makes a check of the code number with code numbers entered on the center file 51 and sends the result of the check to the TC, which, in turn, sends it to the reception input device 40 (S34).

When the code number is confirmed (OK), the personal name corresponding to the card data in the center file 51 is sent to the TC 10 and stored in the reception data field of the reception file 100*a*.

If the message is not code number data, the TC 10 examines from the reception input device 40 (S35) whether or not the message is business selection data. If the message is business selection data, the reception window for the business is searched and stored in the reception file 100*a*. The waiting-person counter 102 at the corresponding window is advanced and the updated count of the counter is multiplied by the average processing time at the window to calculate the expected waiting time. Furthermore, the TC 10 sends the receipt number, the waiting time and the reception window data to the reception input device 40 (S36).

If the message is not business selection data, the TC 10 examines whether or not the message is a response representing termination of processing from the UBTs 20*a* to 20*n* (S37). If it is, the unprocessed flag of the first receipt number for the corresponding window in the waiting-time file 100*b* is set to "0" (processed) and the average processing time is subtracted from the waiting time of the unprocessed receipt number to update the waiting time. Furthermore, the waiting-person counter 102 at the corresponding window is decremented by one. Then, the unprocessed flag of the corresponding receipt number in the reception file 100*a* is deleted as processed (S38).

Furthermore, the first receipt number having the unprocessed flag set in the waiting file 100*b* for the window is found to refer to the reception file 100*a*. If the name corresponding to the receipt number is found, then it is sent to the UBTs 20*a* to 20*n*. Otherwise, the receipt number is sent to the UBTs (S39).

When such message processing is not performed, the TC 10 regularly sends expected waiting times at the respective windows which are obtained from the waiting-person counters 102 for each individual window to the reception input devices 40 as display data.

In this manner the reception is entered by the TC 10, the waiting time is calculated, the waiting time is updated in conjunction with the UBTs, and data on the next customer is sent to a UBT.

Since the TC 10 manages the reception of customers collectively, fewer reception input devices 40 than windows suffices.

Figure 7:
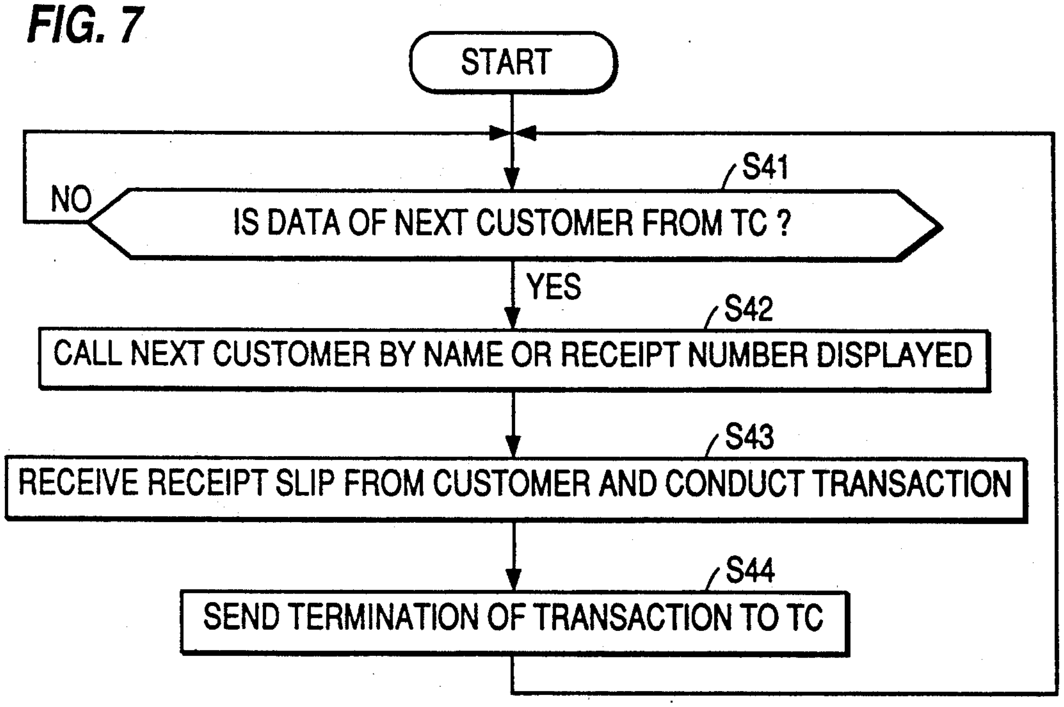
FIG. 7 is a flowchart of the operation of the window terminal (UBT) of FIG. 2.

FIG. 7 is a flowchart of reception processing by the UBTs 20*a* to 20*n*.

The UBTs 20*a* to 20*n* examine whether the next customer display data has been sent from the TC 10 (S41 in FIG. 7).

The UBT which has received the next customer display data displays the data on the displays 200. The teller at the UBT calls the next customer by the name or receipt number displayed on the display 200 (S42). The teller receives the receipt slip from the customer and conducts his or her desired business (S43). When the business is finished, the teller informs the TC 10 through the keyboard 201 (S44) of the termination of the business.

In this manner the next customer data is automatically displayed on the display of the UBT by the TC 10 after the previous customer's business has been conducted, thus alleviating the burden on the teller.

FIG. 8 is a flowchart of the reception processing of the host computer 50.

The host computer 50 examines whether or not a message from the TC 10 comprises code data and card data (S45 in FIG. 8). If it does, the host computer 50 refers to the center file 51 by use of the card data to extract the registered name and code number. The code data in the message is checked with the extracted code number (S46). The host computer 50 then sends the result of the check to the TC 10. At this point, if the code data is confirmed (OK), the name is also sent to the TC 10.

The identification of a customer by the use of a code number at the reception stage is intended to exclude wrong use of a card by a third party, thereby quickening and simplifying the checking work of tellers. By checking a code number with the host computer, the teller can learn the customer's name and call the customer by name.

The above embodiment may be modified as follows.

(1) Although the reception registration file 100 is comprised of the reception file 100*a* and the waiting-time file 100*b*, only the waiting-time file 100*b* may be provided. If a window is common to various businesses, a separate file need not be provided for each window.

(2) Although a card type of reception input device with a magnetic card reader was described, the reception input device may be provided with only a reception request key and ten other keys. In this case, the reception may be input with the reception request key and the receipt number may be input with the ten other keys to make an inquiry about waiting time.

(3) The cards used with the reception input device 40 may all be cards issued by the card dispenser. In this case, the cards issued may be used as receipt slips, thus making the printer unnecessary. Alternatively, the cards used with the reception input device may all be identification cards possessed by customers.

(4) The card used with the reception input device may be any type of card, such as an optical card, an IC card, a bar-code card, etc., provided that it is readable.

(5) If window guidance is not performed, transaction selection need not be performed.

(6) Identification of customers by collating their code numbers has only to be performed if the need arises. In this case, there is no need for communication with the host, thus alleviating the burden on it.

(7) Although an on-line type was described, an off-line type may also be used provided that the controller of the reception input device is equipped with a waiting-time file and the waiting time is updated using a business termination switch provided at the side of a teller.

(8) Although banking business was described, the present invention may be applied to other window business such as in a post office, a hospital, a city hall or the like.

As described above, according to the above embodiment, the following advantages are provided.

(1) When a service request by a customer is entered, the expected waiting time is calculated and stored in a file. The waiting time is progressively updated. Thus, the customer can determine his updated expected waiting time at any time by operating the device and spend the waiting time effectively. This contributes to the improvement of service to customers.

(2) The operator of the window terminal can determine the next customer, thus lightening his burden. The burden on the operator at a time of congestion in particular is lightened. This permits business to be conducted quickly.

(3) The card input facilitates the customer reception operation, lightens the burden on the operator and allows the operator to call the customers by their respective receipt numbers or names.

(4) Since the card issuing means is installed, any customer can be received by use of a card.

(5) Since identification cards are used which allows individuals to be specified, customers can be specified at the reception stage and called by their respective names.

(6) The owner of an identification card is received by the use of his identification card. Customers with no identification card can be received by the use of issued cards. Thus, the bank can accommodate any customer.

(7) Customers can determine their respective waiting times off-line at any time by operating the system.

A second embodiment of the present invention will be described with reference to FIGS. 9 to 12.

Figure 9:
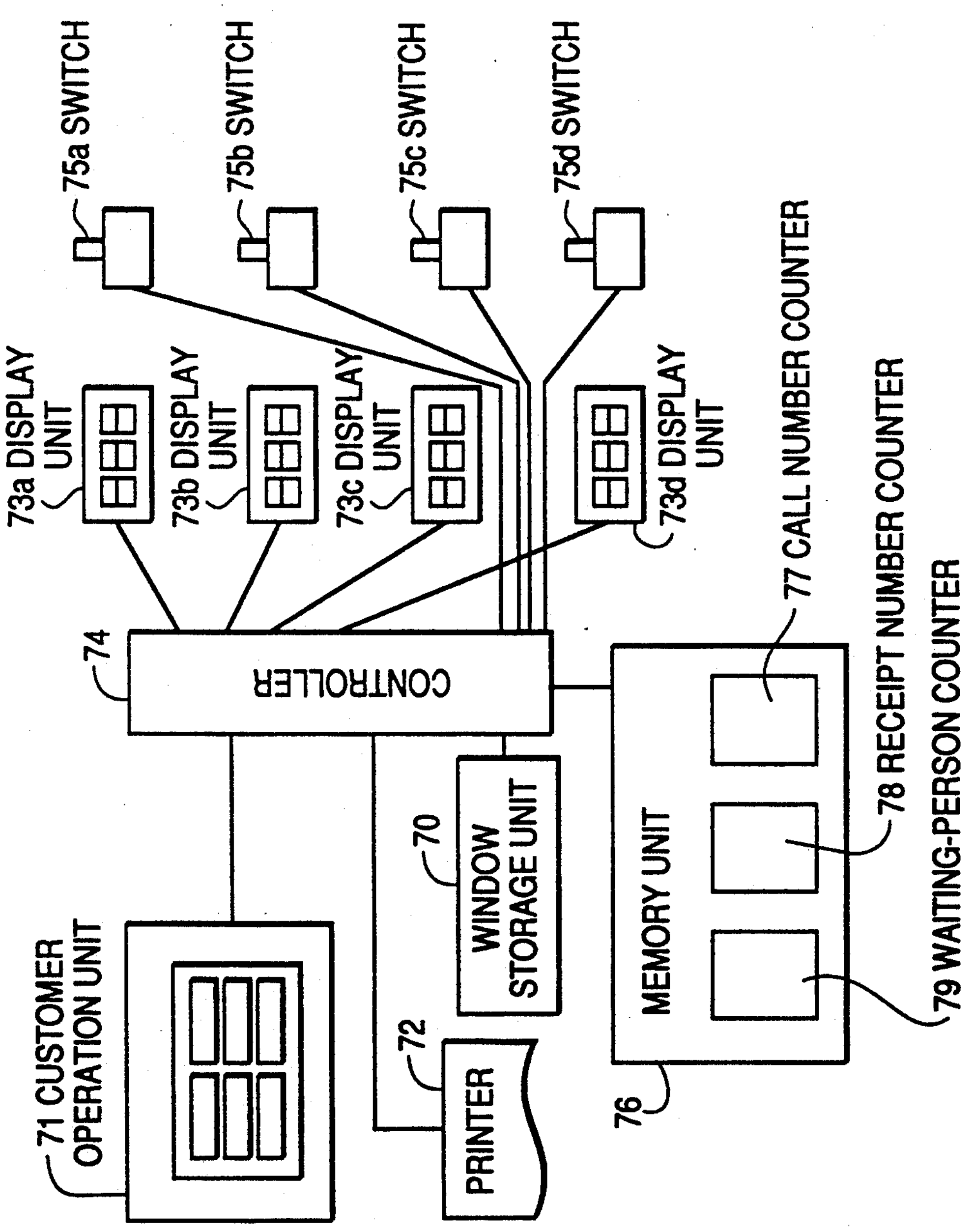
FIG. 9 illustrates the configuration of the second embodiment of the present invention.

FIG. 9 illustrates an example of a window terminal for use in a bank. In the figure, a customer operation unit 71 is an input device with which a customer keys in a desired transaction. It is constructed of a touch keyboard which incorporates a display and a keyboard. A window memory unit 70 stores information about transactions which are conducted at a window. Transaction items are displayed on the customer operation unit 71 on the basis of the information stored in the window memory unit 70.

A memory unit 76 is constructed from a call number counter 77 for storing the last call number processed at each counter, a receipt number counter 78 for storing the last receipt number issued at each window and a waiting person counter 79 for storing numbers of persons waiting at each window. Display units 73*a* to 73*n* display numbers currently being called at respective windows. A printer 72 prints a window and a receipt number on paper tape when a customer performs an input operation and cuts the paper tape to issue a number ticket to the customer. A controller 74 controls each of the units described above.

Each of switches 75*a* to 75*d* is provided on the inside of a respective window and operated by a teller each time a transaction is processed to thereby instruct the call of a customer with the next receipt number.

The operation of the window information apparatus will be described next.

Figure 10:
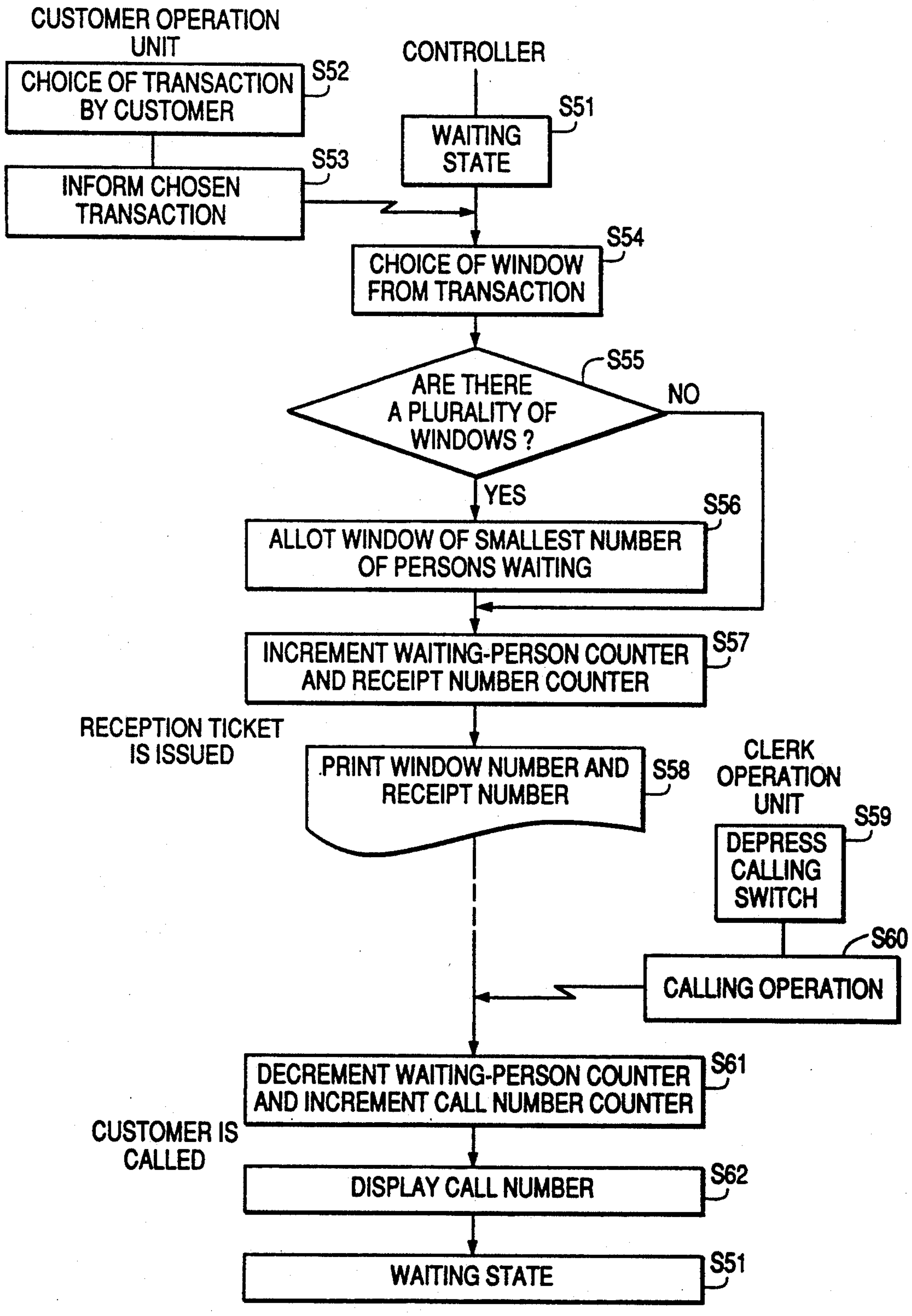
FIG. 10 is a flowchart of the operation of the second embodiment.
Figure 11:
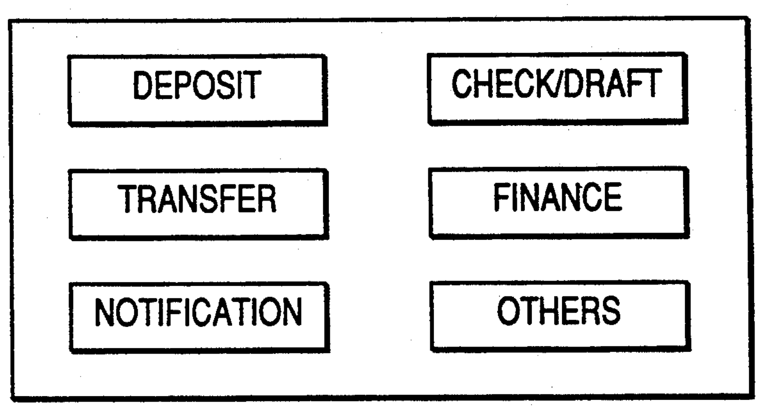

The controller 74 is placed in a waiting state until the customer operation unit 71 is operated by a customer (S1 in FIG. 10). As illustrated in FIG. 11, at this point, the display of the customer operation unit 71 is placed in a state in which a customer can choose a desired transaction. To this end, various kinds of transactions, such as "deposit", "draft/check", "transfer", "finance", "notification" and "others" are displayed. On the surface of the display unit is arranged a transparent touch keyboard. Thus, a customer has only to touch a pad above a displayed item to choose a desired transaction. Moreover, it will be possible for a customer to make a more detailed choice. For example, when the customer chooses "transfer" , then "tax payment", "transfer to another bank" and the like are further displayed.

Also, transactions that can be conducted by a bank or window may be displayed more specifically. That is, for a customer who is uneasy about a window that he learned from an information plate, transactions that can be conducted at the window may be displayed.

The customer operation unit 71 detects whether or not a customer has chosen a transaction (S52). When a choice is made by the customer, the customer operation unit 71 informs the control unit 74 of information about the chosen transaction (S53).

The controller 74 searches the window memory unit 70 and selects a window corresponding to the contents of the transaction (S54). Further, the controller determines whether or not a plurality of windows have been selected (S55). If there are a plurality of windows for one kind of transaction, a reference is made to the waiting person counter 79 to allot the customer to a window where there are few persons waiting (S56). If the same number of persons is waiting at the selected windows, the customer may be allotted to one of them, according to priorities previously assigned to them.

Figure 12:
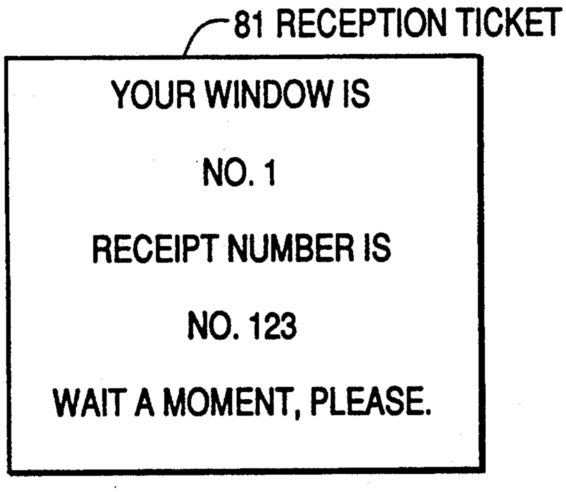
FIG. 12 illustrates an example of a service request ticket.

If there is one window for one kind of transaction, that window is chosen. When a window is determined, the receipt number counter 78 and the waiting person counter 79 for the window are both incremented by a predetermined number (S57). The counts of the counters 78 and 79 and the window number are printed (S58). For example, the fact that the count of the receipt number counter 78 is 123 and the count of the waiting person counter 79 is 6 means that the receipt number of a reception ticket 81 issued to the customer is 123 and the number of persons waiting at the corresponding window is 6. As illustrated in FIG. 12, the customer who operated the customer operation unit 71 is issued with a reception ticket 81 on which the receipt number 123 and the window number 1 are printed. If at least a receipt number and a window number are printed, it is possible to show a customer to a window where his desired transaction is conducted. If the number of persons waiting at the window is also printed on the reception ticket 81, it is possible to offer a more effective service to the customer.

At the windows the tellers conduct transactions. Upon termination of one transaction, the teller depresses the corresponding one switches 75*a* to 75*d*. When the depression of, for example, switch 75*a* is detected (S59), the controller 74 is informed of the fact that the switch 75*a* has been depressed (S60). As a result, the waiting-person counter 79 at the window corresponding to the switch depressed is decremented by a predetermined number and the call counter 77 is incremented by a predetermined number (S61). More specifically, where the count of the waiting person counter 79 is 6 and the count of the call counter 77 is 105, the waiting person counter 79 is decremented to 5 and the call counter is incremented to 106. The count of the waiting person counter is updated when the next customer operates the counter and the updated number of persons waiting is printed on the receipt ticket. The count of the call counter 77 is displayed on a corresponding one of displays 73*a* to 73*d*, for example, the display 73*a* (S62). The next customer is called according to the call number displayed on the display 73*a*. If, in this case, a voice file is provided so that the call number may be output audibly as well as visually, then customers will be called more surely.

If only one kind of transaction is conducted at a window, the time required for one transaction will be substantially constant. In this case, the approximate waiting time as well as the number of waiting persons may be printed.

Furthermore, since the kind of transaction of a customer is known before he or she comes to a window (even if several kinds of transactions are conducted at the window) the approximate waiting time can be calculated. In this case as well, the waiting time as well as the number of waiting persons can be printed.

In the above embodiment, information about a window is printed out. In addition to the window information, other pieces of information may be printed out.

That is, a memory storing information about each transaction may be provided to output transaction information in addition to the window information. For example, to transfer money from a customer's account to another account, a withdrawal slip, a transfer slip and a passbook are usually needed. Even if a customer submits a transfer slip and a passbook to a window, therefore, the teller will not conduct the transaction that the customer desires because a withdrawal slip is missing. In this case, the banker will request the customer to submit the withdrawal slip. Thus, the customer must fill in a withdrawal slip and then line up again at the window or wait until he or she is called by the banker. This will interfere with banking business. Therefore, when information about a transaction is entered into the window information apparatus described above, a message, such as "a withdrawal slip, a transfer slip and a passbook are needed for this transaction", as well as the window information may be visually output to prompt the customer to fill in the necessary slips in advance. If this is done, the banking business will be conducted smoothly.

As described above, according to the second embodiment, the window information apparatus installed in a bank can provide suitable window information to each customer. If customers are also informed of the number of persons waiting, they will have an idea of how long they may have to wait. This will make customers easy and provide them with better service.

What is claimed is:

1. A window information apparatus comprising:
input means for inputting a transaction request of a customer;
window information storage means for storing information of a plurality of windows;
retrieval means for retrieving the information stored in said window information storage means for a window corresponding to the transaction request received by said input means; and
output means for outputting to the customer the information about the window retrieved by said retrieval means.

2. A window information apparatus comprising:
input means for inputting a transaction request of a customer;
window information storage means for storing information of a plurality of windows;
retrieval means for retrieving the information stored in said window information storage means for a window corresponding to the transaction request received by said input means;
output means for outputting to the customer the information about the window retrieved by said retrieval means; and
informing means for informing the window retrieved by said retrieval means of the transaction request of the customer.

3. A window information apparatus comprising:
input means for inputting a transaction request of a customer;
window information storage means for storing information of a plurality of windows and a number of persons waiting at each of the windows;
retrieval means for retrieving the information stored in said window information storage means a window corresponding to the transaction request input to said input means; and
output means for outputting to the customer information about the window and the number of persons waiting at the window retrieved by said retrieval means.

4. A window information apparatus comprising:
input means for inputting a transaction request of a customer;
window information storage means for storing information of a plurality of windows and a number of persons waiting at each of the windows;
retrieval means for retrieving the information stored in said window information storage means a window corresponding to the transaction request input to said input means;
waiting-time calculating means for calculating an expected waiting time at the window from the number of persons waiting at the window retrieved by said retrieval means; and
output means for outputting to the customer the information about the window retrieved by said retrieval means and the expected waiting time calculated by said waiting time calculating means.

5. The window information apparatus according to claim 1, wherein when there are more than the one of the windows that correspond to the transaction request input to said input means, said retrieval means includes means for retrieving a window having a smallest number of persons waiting for the transaction request.

6. A window information apparatus comprising:
a reception input device having an input unit for receiving a transaction request of a customer;
an output unit for outputting a reception output;
a window terminal installed at a window; and
a controller coupled to said window terminal, said reception input device and said output unit, and responsive to the transaction request from said reception input device for assigning a receipt number, for calculating an expected waiting time at a window corresponding to the transaction request and storing the transaction request in a reception file, for outputting the receipt number and the expected waiting time to said reception input device, for updating the expected waiting time stored in the reception file in response to a termination of processing in said window terminal, and for outputting the expected waiting time stored in the reception file to said reception input device in response to san inquiry about expected waiting time from said reception input device.

7. The window information apparatus according to claim 6, wherein said controller includes means for responding to termination of processing at said window terminal by outputting a next receipt number to said window terminal for display.

8. The window information apparatus according to claim 6, wherein said input unit includes a card reader for reading a card of the customer, and wherein
said controller includes means for storing contents of the card read by said card reader and for responding to termination of processing in said window terminal by outputting a next receipt number to said window terminal for display.

9. The window information apparatus according to claim 8, wherein said reception input device includes card issuing means for issuing a card with readable identification data, the card being taken by the customer from said card issuing means and then being read by said card reader for a reception input.

10. The window information apparatus according to claim 8, in which said card is an identification card owned by a customer.

11. The window information apparatus according to claim 9, wherein said card issuing means includes means for providing the card from said card issuing means to the customer and for providing the card as an identification card owned by the customer.

12. A window information apparatus comprising:
input means for receiving a transaction request of a customer;
output means for outputting a reception output; and
a controller responsive to the reception request from said input means for assigning a receipt number for calculating an expected waiting time at a window corresponding to the transaction request and storing the transaction request in a reception file, for outputting the receipt number and the expected waiting time to said output means, for updating the expected waiting time in the reception file in response to termination of processing at the window; and for providing the expected waiting time stored in the reception file to said output means in response to an inquiry about the expected waiting time from said input means.

* * * * *